(12) United States Patent
Gabaldon

(10) Patent No.: US 11,140,866 B2
(45) Date of Patent: Oct. 12, 2021

(54) FEEDING DISH CARRYING ASSEMBLY

(71) Applicant: Raymond Gabaldon, Artesia, NM (US)

(72) Inventor: Raymond Gabaldon, Artesia, NM (US)

( * ) Notice: Subject to any disclaimer, the term of this patent is extended or adjusted under 35 U.S.C. 154(b) by 201 days.

(21) Appl. No.: 16/522,347

(22) Filed: Jul. 25, 2019

(65) Prior Publication Data

US 2021/0022316 A1 Jan. 28, 2021

(51) Int. Cl.
*A01K 5/01* (2006.01)
*A47G 23/06* (2006.01)

(52) U.S. Cl.
CPC ........ *A01K 5/0107* (2013.01); *A47G 23/0616* (2013.01); *A47G 23/0641* (2013.01)

(58) Field of Classification Search
CPC .... A01K 5/01; A01K 5/0107; A47G 23/0616; A47G 23/0641; B65D 25/2838; B65D 25/2852; B65D 25/2855; B65D 25/2867; B65D 25/2882; B65D 25/32
USPC ...... 119/61.5, 61.54, 61.56, 61.57; D30/133; 206/562, 315.11

See application file for complete search history.

(56) References Cited

U.S. PATENT DOCUMENTS

| | | | |
|---|---|---|---|
| 2,584,301 A | 2/1952 | Sinclair | |
| 3,068,607 A * | 12/1962 | Ward | A01K 97/05 43/56 |
| 4,845,881 A * | 7/1989 | Ward | A01K 97/22 43/21.2 |
| 5,501,176 A | 3/1996 | Tully | |
| 5,887,545 A | 3/1999 | Cuttress | |
| 6,681,719 B1 | 1/2004 | Warner | |
| 6,729,066 B1 * | 5/2004 | Howley | A01K 97/05 43/54.1 |
| D602,652 S | 10/2009 | Horvath | |

* cited by examiner

*Primary Examiner* — Peter M Poon
*Assistant Examiner* — Danielle A Clerkley

(57) ABSTRACT

A feeding dish carrying assembly for carrying multiple feeding dishes for animals includes a basket for carrying objects. A handle is coupled to the basket for carrying the basket. A panel is coupled to the basket and the panel has a plurality of dish openings therein. Each of the dish openings can insertably receive a respective one of a plurality of feeding dishes for carrying the feeding dishes. A plurality of legs is each coupled to and extends downwardly from the panel. Each of the legs supports the panel and the basket above a support surface when the basket is placed on the support surface.

4 Claims, 4 Drawing Sheets

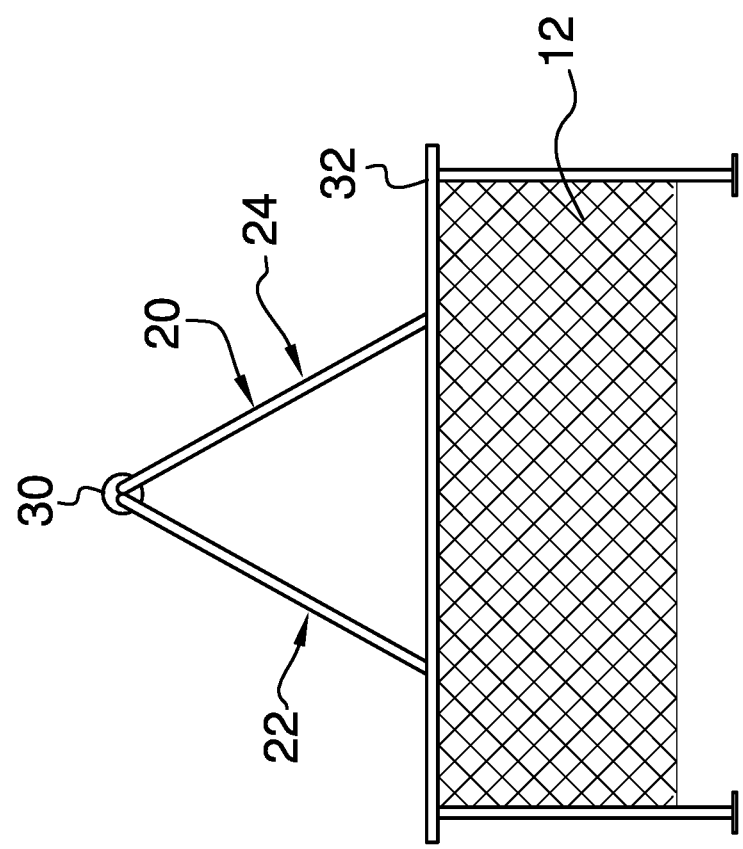

FEEDING DISH CARRYING ASSEMBLY

CROSS-REFERENCE TO RELATED APPLICATIONS

Statement Regarding Federally Sponsored Research or Development

Not Applicable

The Names of the Parties to a Joint Research Agreement

Not Applicable

Incorporation-By-Reference Of Material Submitted On A Compact Disc or as a Text File Via the Office Electronic Filing System Not Applicable Statement Regarding Prior Disclosures by the Inventor or Joint Inventor Not Applicable

BACKGROUND OF THE INVENTION

(1) Field of the Invention

The disclosure relates to carrying devices and more particularly pertains to a new carrying device for carrying multiple feeding dishes for animals.

(2) Description of Related Art Including Information Disclosed Under 37 CFR 1.97 and 1.98

The prior art relates to carrying devices.

BRIEF SUMMARY OF THE INVENTION

An embodiment of the disclosure meets the needs presented above by generally comprising a basket for carrying objects. A handle is coupled to the basket for carrying the basket. A panel is coupled to the basket and the panel has a plurality of dish openings therein. Each of the dish openings can insertably receive a respective one of a plurality of feeding dishes for carrying the feeding dishes. A plurality of legs is each coupled to and extends downwardly from the panel. Each of the legs supports the panel and the basket above a support surface when the basket is placed on the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a right side view of an embodiment of the disclosure.

DETAILED DESCRIPTION OF THE INVENTION

Figure 1:
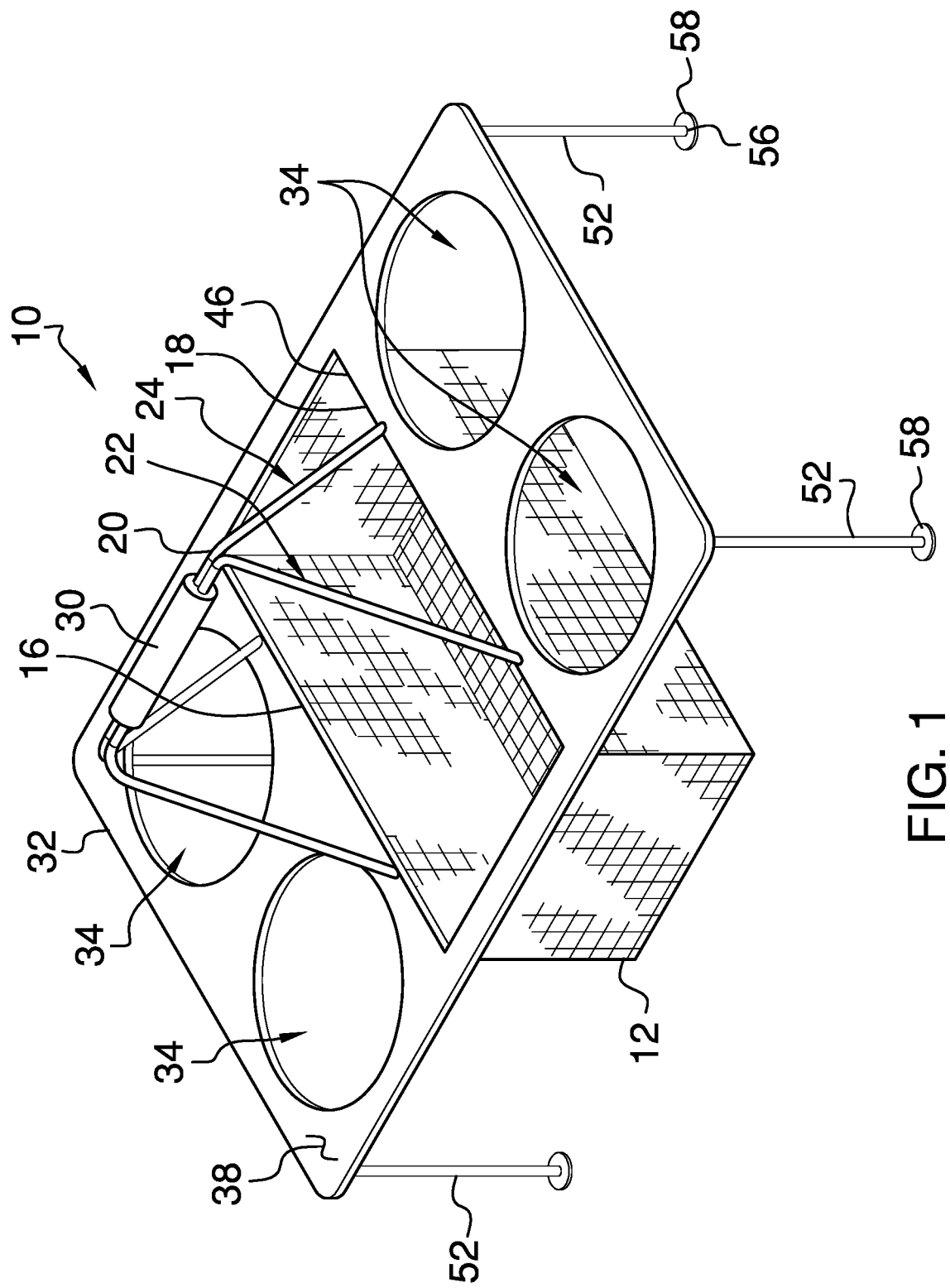
FIG. 1 is a top perspective view of a feeding dish carrying assembly according to an embodiment of the disclosure.
Figure 2:
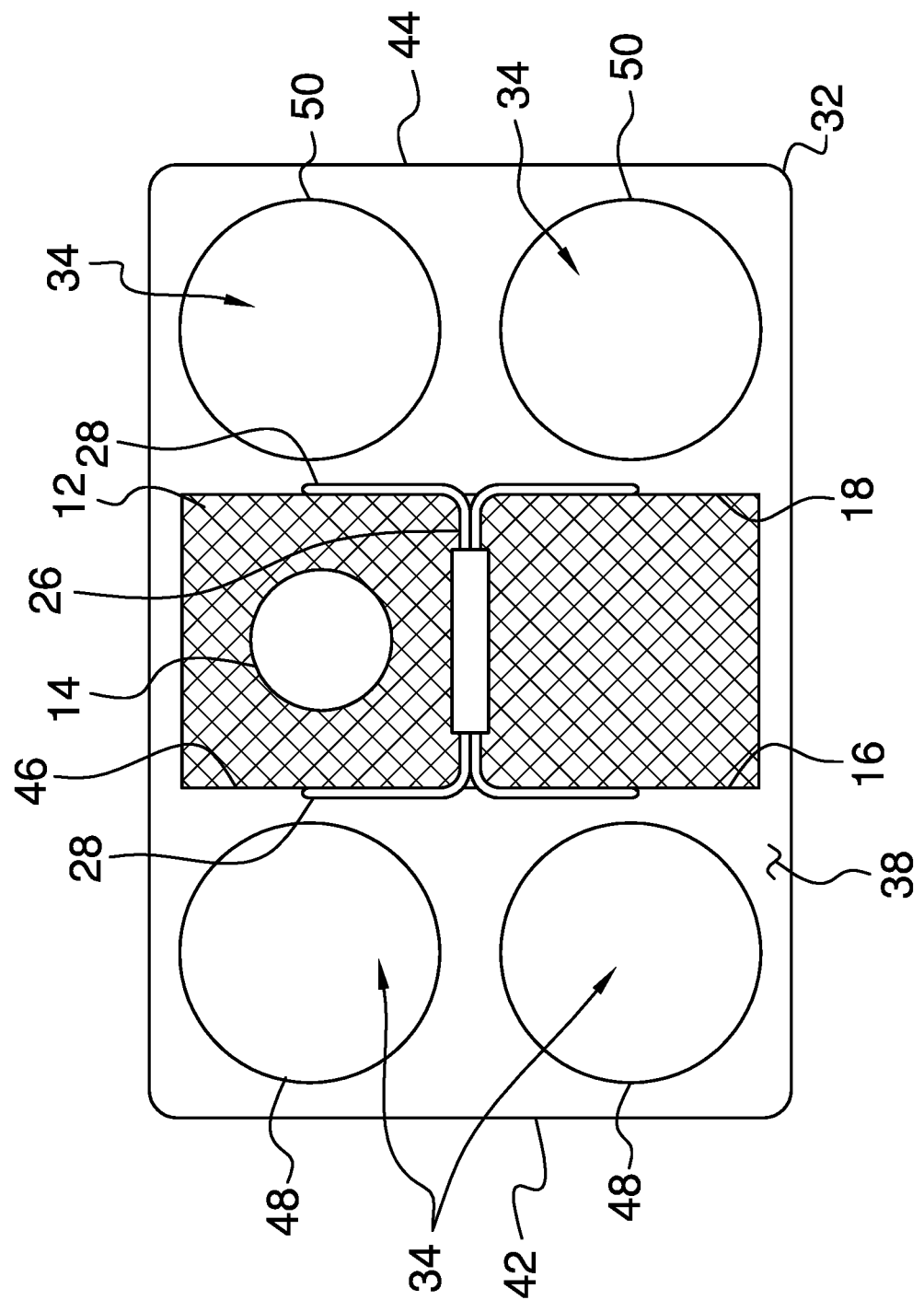
FIG. 2 is a top view of an embodiment of the disclosure.
Figure 3:
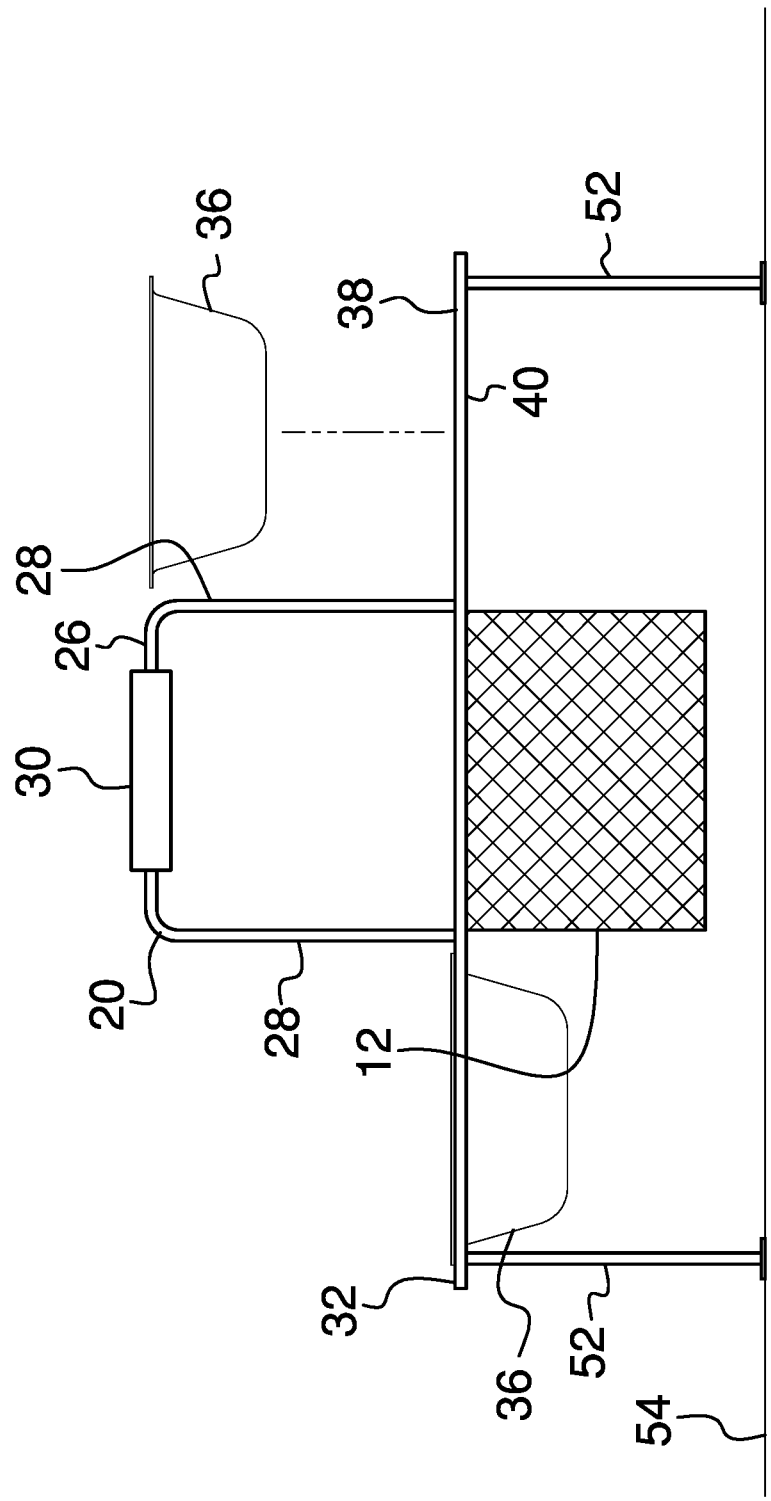
FIG. 3 is a front exploded view of an embodiment of the disclosure.

With reference now to the drawings, and in particular to FIGS. 1 through 4 thereof, a new carrying device embodying the principles and concepts of an embodiment of the disclosure and generally designated by the reference numeral 10 will be described.

As best illustrated in FIGS. 1 through 4, the feeding dish carrying assembly 10 generally comprises a basket 12 for carrying objects 14. The objects 14 may be chew toys, brushes or any other type of object associated with the care of domesticated dogs or other pets. The basket 12 has a first lateral side 16 and a second lateral side 18. The basket 12 may have a length of approximately 18.0 inches, a width of approximately 8.0 inches and a height of approximately 6.0 inches.

A handle 20 is coupled to the basket 12 for carrying the basket 12 and the handle 20 includes a first section 22 and a second section 24. Each of the first section 22 and the second section 24 comprises a center member 26 extending between a pair of outward members 28. Each of the outward members 28 of each of the first section 22 and the second section 24 is coupled to and extends upwardly from a respective one of the first lateral side 16 and the second lateral side 18 of the basket 12. Moreover, the first section 22 and the second section 24 are angled toward each other such that the center member 26 of the first section 22 abuts the center member 26 of the second section 24. A grip 30 extends around the center member 26 of each of the first section 22 and the second section 24 of the handle 20. The grip 30 is comprised of a resiliently compressible material to enhance comfort for gripping.

A panel 32 is provided and the panel 32 is coupled to the basket 12. The panel 32 has a plurality of dish openings 34 therein. Each of the dish openings 34 insertably receives a respective one of a plurality of feeding dishes 36 for carrying the feeding dishes 36. In this way a person can carry multiple feeding dishes 36 for multiple dogs in one trip. Thus, the basket 12 and the panel 32 enhance efficiency with respect to feeding and caring for multiple dogs.

The panel 32 has a top surface 38, a bottom surface 40, a first lateral edge 42 and a second lateral edge 44. The panel 32 has a basket opening 46 extending through the top surface 38 and the bottom surface 40. The basket opening 46 is centrally positioned between the first lateral edge 42 and the second lateral edge 44. Moreover, the basket 12 is aligned with the basket opening 46 having the basket 12 extending downwardly from the bottom surface 40 of the panel 32. The panel 32 may have a length of approximately 26.0 inches and a width of approximately 20.0 inches.

Each of the dish openings 34 extends through the top surface 38 and the bottom surface 40. The plurality of dish openings 34 includes a set of first dish openings 48 and a set of second dish openings 50. Each of the first dish openings 48 is positioned between the first lateral side 16 of the basket 12 and the first lateral edge 42 of the panel 32. Additionally, each of the second dish openings 50 is positioned between the second lateral side 18 of the basket 12 and the second lateral edge 44 of the panel 32. Each of the dish openings 34 may have a diameter ranging between approximately 6.0 inches and 8.0 inches for accommodating various sizes of feeding dishes 36.

A plurality of legs 52 is each coupled to and extends downwardly from the panel 32. Each of the legs 52 supports the panel 32 and the basket 12 above a support surface 54 when the basket 12 and the panel 32 are placed on the support surface 54. The support surface 54 may be the ground, a floor or any other horizontal support surface. Each of the legs 52 is positioned on the bottom surface 40 of the panel 32. Each of the legs 52 has a distal end 56 with respect to the bottom surface 40 of the panel 32 for abutting the support surface 54 and each of the legs 52 is aligned with a respective one of four corners of the panel 32. Additionally, each of the legs 52 may have a length of approximately 8.0 inches. A plurality of feet 58 may each be coupled to the distal end 56 of a respective one of the legs 52.

In use, the feeding dishes 36 are filled with food and each of the feeding dishes 36 is placed in a respective one of the dish openings 34. Objects 14 related to the care and feeding of domesticated dogs or other pets are placed in the basket 12. In this way each of the feeding dishes 36 and the objects 14 can be carried by a person using only one hand. Thus, the basket 12 and the panel 32 enable the person to simultaneously feed and care for multiple domesticated dogs or other pets.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A feeding dish carrying assembly being configured to carry a plurality of feeding dishes for animals, said assembly comprising:
   a basket for carrying objects, said basket having a first lateral side and a second lateral side;
   a handle being coupled to said basket for carrying said basket, said handle including a first section and a second section, each of said first section and said second section comprising a center member extending between a pair of outward members, each of said outward members of each of said first section and said second section being coupled to and extending upwardly from a respective one of said first lateral side and said second lateral side of said basket, said first section and said second section being angled toward each other having said center member of said first section abutting said center member of said second section;
   a grip extending around said center member of each of said first section and said second section of said handle, said grip being comprised of a resiliently compressible material to enhance comfort for gripping;
   a panel being coupled to said basket, said panel having a plurality of dish openings therein wherein each of said dish openings is configured to insertably receive a respective one of a plurality of feeding dishes for carrying the feeding dishes, said panel having a top surface, a bottom surface, a first lateral edge and a second lateral edge, said panel having a basket opening extending through said top surface and said bottom surface, said basket opening being centrally positioned between said first lateral edge and said second lateral edge, said basket being aligned with said basket opening having said basket extending downwardly from said bottom surface of said panel; and
   a plurality of legs, each of said legs being coupled to and extending downwardly from said panel, each of said legs supporting said panel and said basket above a support surface when said basket is placed on the support surface.

2. The assembly according to claim 1, wherein:
   each of said dish openings extends through said top surface and said bottom surface;
   said plurality of dish openings including a set of first dish openings and a set of second dish openings;
   each of said first dish openings is positioned between said first lateral side of said basket and said first lateral edge of said panel; and
   each of said second dish openings is positioned between said second lateral side of said basket and said second lateral edge of said panel.

3. The assembly according to claim 1, wherein each of said legs is positioned on said bottom surface of said panel, each of said legs having a distal end with respect to said bottom surface of said panel for abutting the support surface, each of said legs being aligned with a respective one of four corners of said panel.

4. A feeding dish carrying assembly being configured to carry a plurality of feeding dishes for animals, said assembly comprising:
   a basket for carrying objects, said basket having a first lateral side and a second lateral side;
   a handle being coupled to said basket for carrying said basket, said handle including a first section and a second section, each of said first section and said second section comprising a center member extending between a pair of outward members, each of said outward members of each of said first section and said second section being coupled to and extending upwardly from a respective one of said first lateral side and said second lateral side of said basket, said first section and said second section being angled toward each other having said center member of said first section abutting said center member of said second section;
   a grip extending around said center member of each of said first section and said second section of said handle, said grip being comprised of a resiliently compressible material to enhance comfort for gripping;

a panel being coupled to said basket, said panel having a plurality of dish openings therein wherein each of said dish openings is configured to insertably receive a respective one of a plurality of feeding dishes for carrying the feeding dishes, said panel having a top surface, a bottom surface, a first lateral edge and a second lateral edge, said panel having a basket opening extending through said top surface and said bottom surface, said basket opening being centrally positioned between said first lateral edge and said second lateral edge, said basket being aligned with said basket opening having said basket extending downwardly from said bottom surface of said panel, each of said dish openings extending through said top surface and said bottom surface, said plurality of dish openings including a set of first dish openings and a set of second dish openings, each of said first dish openings being positioned between said first lateral side of said basket and said first lateral edge of said panel, each of said second dish openings being positioned between said second lateral side of said basket and said second lateral edge of said panel; and a plurality of legs, each of said legs being coupled to and extending downwardly from said panel, each of said legs supporting said panel and said basket above a support surface when said basket is placed on the support surface, each of said legs being positioned on said bottom surface of said panel, each of said legs having a distal end with respect to said bottom surface of said panel for abutting the support surface, each of said legs being aligned with a respective one of four corners of said panel.

\* \* \* \* \*